United States Patent [19]

Ona et al.

[11] 4,427,815

[45] Jan. 24, 1984

[54] FIBER-TREATING COMPOSITIONS COMPRISING TWO ORGANOFUNCTIONAL POLYSILOXANES

[75] Inventors: Isao Ona, Sodegaura; Masaru Ozaki; Yoichiro Taki, both of Ichihara, all of Japan

[73] Assignee: Toray Silicone Company, Ltd., Tokyo, Japan

[21] Appl. No.: 394,966

[22] Filed: Jul. 2, 1982

[51] Int. Cl.$^3$ ............ C04B 31/00; C08L 83/04; C08K 5/01; D06M 15/66

[52] U.S. Cl. .................. 524/315; 524/588; 252/8.8

[58] Field of Search ............... 252/8.8; 524/315, 588

[56] References Cited

U.S. PATENT DOCUMENTS

| | | | |
|---|---|---|---|
| 2,970,150 | 1/1961 | Bailey | 252/8.8 |
| 3,876,459 | 4/1975 | Burrill | 117/141 |
| 3,980,599 | 9/1976 | Kondo et al. | 260/29.2 M |
| 4,247,592 | 1/1981 | Kalinowski | 428/266 |
| 4,311,626 | 1/1982 | Ona et al. | 252/8.8 |
| 4,311,737 | 1/1982 | Ishizaka et al. | 252/8.8 |
| 4,359,545 | 11/1982 | Ona et al. | 524/262 |
| 4,366,001 | 12/1982 | Ona et al. | 16/287.11 |

FOREIGN PATENT DOCUMENTS

| | | |
|---|---|---|
| 48-17514 | 5/1973 | Japan . |
| 53-19716 | 6/1978 | Japan . |
| 53-19715 | 7/1978 | Japan . |
| 53-98499 | 8/1978 | Japan . |
| 1296136 | 11/1972 | United Kingdom . |

*Primary Examiner*—Maria Parrish
*Attorney, Agent, or Firm*—George A. Grindahl

[57] ABSTRACT

Fiber-treating compositions are disclosed which have, as their effective components, two organopolysiloxanes. One of the organopolysiloxanes contain carboxylic-substituted hydrocarbon groups. The other organopolysiloxane contains polyoxyalkylene-substituted hydrocarbon groups and either amine-substituted hydrocarbon groups or epoxy-substituted hydrocarbon groups. These compositions, when applied to a fiber material and heated, react to provide a durable silicone treatment for the material.

6 Claims, No Drawings

FIBER-TREATING COMPOSITIONS COMPRISING TWO ORGANOFUNCTIONAL POLYSILOXANES

BACKGROUND OF THE INVENTION

The present invention concerns a composition for treating fibers. More specifically, it concerns a composition for treating fibers to give the fiber material long-lasting antistatic properties, moisture and perspiration absorptivity, stain resistance, softness, smoothness, crease resistance, compression recoverability, etc.

In the past, treatment agents composed of various organopolysiloxanes and compositions thereof have been presented or proposed in order to give fiber materials softness, smoothness, crease resistance, and recoverability, etc.

For example, in order to give softness, a dimethylpolysiloxane oil and emulsions thereof are known. In order to give long-lasting softness, crease resistance and recoverability, a treatment agent composed of methyl hydrogen polysiloxane, hydroxyl endblocked dimethylpolysiloxane and a catalyst for condensation reactions; and a treatment agent composed of methyl hydrogen polysiloxane, diorganopolysiloxane containing vinyl groups, and a catalyst for addition reactions are known.

More recently, a treatment agent composed of an organopolysiloxane containing at least two epoxy groups in each molecule and an organopolysiloxane containing amino groups has been proposed in Japanese Patent Sho 48[1973]-17514 in order to make synthetic organic fibers smooth; a treatment agent composed of hydroxyl enblocked diorganopolysiloxane, organosilane containing amino groups and alkoxy groups in each molecule, and/or the partial hydrolysate and condensation product thereof, has been proposed in Japanese Patent Sho 53[1978]-36079; a treatment agent composed of aminoalkyltrialkoxysilane and organopolysiloxane containing epoxy groups has been proposed in Japanese Patent Sho 53[1978]-19715 and Sho 53[1978]-19716; and a trimethylsiloxy endblocked diorganopolysiloxane which contains at least two amino alkyl groups in each molecule is proposed in Japanese Patent Sho 53[1979]-98499.

However, these conventionally known treatment agents suffer various drawbacks. For example, the treatment agent which has as its principal component dimethylpolysiloxane oil has the drawback that its crease resistance and recoverability are not adequate, and its softness and smoothness lack durability.

The treatment agent who essential ingredient is alkoxysilane has the defect that when used as an emulsion the alkoxysilane tends to hydrolyze and the life span of the treatment bath is short. It also has the defect that it feels too stiff.

The treatment agent whose essential ingredient is methyl hydrogen polysiloxane has the drawback that the curing reaction is not adequate unless a catalyst is used. It further has the defect that when a catalyst is used, the life of the treatment bath becomes short; moreover, hydrogen gas is generated in large volume, with the danger of causing a fire or explosion. In the case of the treatment agents whose main ingredients are organopolysiloxanes containing epoxy groups and organopolysiloxanes containing amino groups, there are the drawbacks that there is considerable generation of static electricity due to friction, oily stains tend to adhere, and when used for underwear, moisture and perspiration absorptivity decline.

In order to improve these compositions, hydrophilic surfactants such as sulfuric acid ester salts of ricinoleic acid, Turkey red oil, polysiloxane-polyoxyalkylene copolymer, the polyoxyethylene addition product of higher alcohols, etc., have come to be added to the treating agent. However, these surfactants have the drawback of lacking durability because they tend to dissolve in water or in the organic solvents which are used in dry cleaning and tend to wash off with repeated laundering.

BRIEF SUMMARY OF THE INVENTION

As a result of an intensive investigation to eliminate the drawbacks of conventionally well-known treatment agents for fibers such as described above, the present invention invented a treatment agent for fibers which is able to give fiber materials durable antistatic properties, moisture and perspiration absorptivity, stain resistance, softness, smoothness, crease resistance, and compression recoverability.

The present invention is a treatment composition for fibers whose principle components are (A) and (B) or (A) and (C), from among the three varieties of organopolysiloxane, (A), (B) and (C), indicated below.

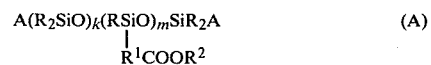  (A)

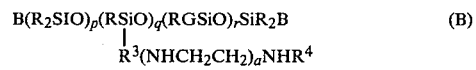  (B)

  (C)

That is, the fiber treatment agent of the present invention is primarily composed of an organopolysiloxane mixture which is formed from a combination of (A) and (B) or (A) and (C). It is based upon a confirmation of the fact that each organopolysiloxane, (A), (B) and (C), do no more than give the fiber material antistatic properties, moisture and perspiration absorptivity, softness, smoothness, crease resistance, and compression recoverability which lack durability when used alone. But by combining organopolysiloxane (A) with either organopolysiloxane (B) or (C) the carboxy groups and amino groups and the carboxy groups and epoxy groups (in this case, it is better to use a catalyst) are crosslinked simply by heat treatment, so not only do the above effects improve, but it is possible to give them durability. The durability spoken of here means standing up well to laundering with water and dry cleaning and providing long service.

DETAILED DESCRIPTION OF THE INVENTION

The present invention relates to a composition for treating fibers, said composition comprising an organopolysiloxane component (A) having the formula

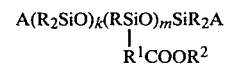

and one other organopolysiloxane component selected from the group consisting of an organopolysiloxane (B) have the formula

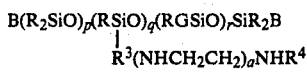

and an organopolysiloxane (C) having the formula $D(R_2SiO)_x(RESiO)_y(RGSiO)_zSiR_2D$, wherein, at each occurrence, A denotes R or $R^1COOR^2$; B denotes R or $R^3(NHCH_2CH_2)_aNHR^4$ or G; D denotes R or E or G; E denotes

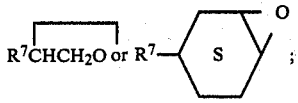

G denotes $R_b^5O(C_2H_4O)_c(C_3H_6O)_dR^6$; R denotes a substituted or unsubstituted monovalent hydrocarbon group; $R^1$ denotes a divalent hydrocarbon group; $R^2$ denotes a hydrogen atom or a monovalent hydrocarbon group; $R^3$ denotes a divalent hydrocarbon group; $R^4$ denotes a hydrogen atom or a monovalent hydrocarbon group; $R^5$ denotes a divalent organic group; $R^6$ denotes a hydrogen atom or a terminating group; $R^7$ denotes a divalent organic group; a has a value of from 0 to 10; b has a value of 0 or 1; c has a value of from 0 to 50; d has a value of from 0 to 50; c+d has a value of from 1 to 100; k has a value of from 0 to 2000; m has a value of from 0 to 200; k+m has a value of from 1 to 2000; p has a value of from 0 to 1000; q has a value of from 0 to 100; r has a value of from 0 to 100; p+q+r has a value of from 2 to 1000; x has a value of from 0 to 1000; y has a value of from 0 to 100; z has a value of from 0 to 100 and x+y+z has a value of from 2 to 1000; there being at least two $R^1COOR^2$ groups per molecule of component (A), at least two $R^3(NHCH_2CH_2)_aNHR^4$ groups and at least one G group per molecule of component (B) and at least two E groups and at least one G group per molecule of component (C).

The organopolysiloxane component (A) is expressed by the above-indicated general formula. In said formula R is a substituted or unsubstituted monovalent hydrocarbon group, and is represented by alkyl groups such as the methyl group, ethyl group, propyl group and dodecyl group; alkenyl groups such as the vinyl group; aryl groups such as the phenyl group; aralkyl groups such as the *-phenylethyl group; and haloalkyl groups such as the 3,3,3-trifluoropropyl group.

It is not necessary that all the R's in each molecule be identical. R is most preferably a methyl group, but a combination of methyl groups and other groups is also suitable.

$R^1$ of the $R^1COOR^2$ group is a divalent hydrocarbon group, and is represented by alkylene groups such as $-CH_2-$, $-CH_2CH_2-$, $-CH_2CH_2CH_2-$, $-CH_2CH(CH_3)CH_2-$, $-(CH_2)_4-$, and alkylene-arylene groups such as $-(CH_2)_2C_6H_4-$. Among these, the alkylene group is preferred.

$R^2$ is a hydrogen atom or monovalent hydrocarbon group, and the latter is represented by the methyl group, ethyl group, propyl group, hexyl group and phenyl group.

A is a group selected from the above-mentioned R and $R^1COOR^2$ groups.

In the above-indicated formula for component (A) k is 0 to 2000 and m is 0 to 200; but, because at least two $R^1COOR^2$ groups are required in each molecule, when m is 0, both A's are $R^1COOR^2$ groups, and when m is 1 at least one of the A's is a $R^1COOR^2$ group. The sum of k+m is 1 to 2000.

In order to cause the carboxy groups or carboxylic acid ester groups of component (A) to cross-link with the amino groups of component (B) or the epoxy groups of component (C) and give the fiber material long-lasting antistatic properties, moisture and perspiration absorptivity, stain resistance, softness, smoothness, crease resistance, and compression recoverability, at least two $R^1COOR^2$ groups are required in each molecule of component (A). These $R^1COOR^2$ groups may be present in any part of the molecular structure of the organopolysiloxane. Also, when the value of k+m (particularly k) is low, the effect of giving softness and smoothness to the fiber material decreases, and when it is high, the component (A) becomes difficult to emulsify, so the preferred range of k+m is 10 to 1000.

This component (A) can be produced using the addition reaction described, for example, in Japanese Patents Sho 33[1958]-9969 and Sho 36[1961]-1293.

The organopolysiloxane component (B) is expressed by the general formula stated above. In said formula R is a substituted or unsubstituted monovalent hydrocarbon group, and is represented by the same groups as delineated for R in component (A). It is not necessary that all of the R's in each molecule be identical. R is most preferably a methyl group, but a combination of methyl groups with other groups is also suitable.

The $R^3$ of the $R^3(NHCH_2CH_2)_aNHR^4$ group is a divalent hydrocarbon group, and is represented by the groups denoted for $R^1$ in component (A). Among these, the alkylene group is the most preferred $R^3$ group. $R^4$ is a hydrogen atom or monovalent hydrocarbon group, and the monovalent hydrocarbon group is represented by the same groups as delineated for $R^2$ in component (A). In the above-indicated formula for component (B) a is a number from 0 to 10.

Herein G is $(R^5)_bO(C_2H_4O)_c(C_3H_6O)_dR^6$ wherein $R^5$ is a divalent organic group, and is represented by alkylene groups with 1 to 5 carbon atoms, and by groups in which a $-C_6H_4-$ group, $-CO-$ group, or $-NH-CO-$ group is bonded through an alkylene group to a silicon atom and $R^6$ is a hydrogen atom or a terminating group, which is represented by monovalent hydrocarbon groups, acyl groups, and monoester carbonate groups. The monovalent hydrocarbon terminating group is represented by the methyl group, ethyl group, propyl group, dodecyl group, cyclohexyl group, phenyl group, *-phenylethyl group, etc. and the acyl terminating group is represented by acetyl group, propionyl group, benzoyl group, etc. In the above-indicated formula for G b is 0 or 1; c and d are 0 to 50, but c+d is 1 to 100.

B is a group selected from the above-mentioned R, $R^3(NHCH_2CH_2)_aNHR^4$, and G. In the above-indicated formula for component (B) p is 0 to 1000 and q and r are 0 to 100, but p+q+r is 2 to 1000.

In order to make the amino groups of component (B) cross-link with the carboxy groups or carboxylic acid ester groups of component (A) and give the treated fiber material durable antistatic properties, moisture and perspiration absorptivity, stain resistance, softness, smoothness, crease resistance, and compression recoverability, it is necessary that there be at least two $R^3(NHCH_2CH_2)_aNHR^4$ groups in each molecule of component (B). In the same molecule, there must also be at least one polyoxyalkylene groups (G) in order to give the treated fiber material antistatic properties, moisture and perspiration absorptivity, and stain resistance. The $R^3(NHCH_2CH_2)_aNHR^4$ groups and polyoxyalkylene groups may be present in any part of the molecular structure of the organopolysiloxane.

When the value of c+d of the polyoxyalkylene group is too small, the solubility of component (B) in water systems or its self-emulsifying properties are poor, and the effects of antistatic properties, moisture and perspiration absorptivity, and stain resistance are deficient. When the value of c+d is too large, there is the possibility that the polyoxyalkylene group will become branched at the time of manufacture. Thus, the range of 5 to 50 for c+d is desirable. Also, the desirable range of each siloxane unit of component (B) is p=10 to 500, q=2 to 40, r=1 to 30, p+q+r=10 to 500. This component (B) can be manufactured on the basis of the method described, for example, in Japanese Patent Sho 53[1978]-98499.

The organopolysiloxane component (C) is represented by the general formula stated above. In said formula R is a substituted or an unsubstituted monovalent hydrocarbon group and is represented by the same examples as for the R explained in the case of component (A).

The monovalent organic group containing epoxy denoted by E is represented by the general formula

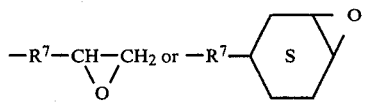

wherein $R^7$ is a divalent organic group, and is represented by alkylene, such as the methylene group, ethylene group and propylene group; arylene, such as the phenylene group; a hydrocarbon hydroxide residue; haloalkylene such as a chloroethylene group and a fluoroethylene group; and oxyalkylene, such as

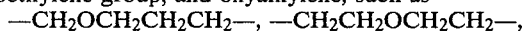

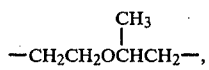

The polyoxyalkylene group denoted by G in component (C) is as delineated and as preferred for component (B) above. In the above-indicated formula for component (C), D is either an R group, an E group or a G group.

The value of x is 0 to 1000 and the values of y and z are 0 to 100, but x+y+z has a value of from 2 to 1000.

In each molecule of component (C) there must be at least two organic groups containing epoxy groups and at least one polyoxyalkylene group, for reasons similar to those explained in the case of component (A) and component (B). These epoxy-containing organic groups and polyoxyalkylene units may be present in any part of the molecular structure of the organopolysiloxane. This component (C) can be produced using the addition reaction described, for example, in Japanese Patents Sho 33[1958]-9969 and Sho 36[1961]-1293, just as in the case of component (A).

The compositions of this invention comprising components (A) and (B) or (A) and (C) may be prepared as a treatment solution by dissolving them in an organic solvent such as toluene, xylene, benzene, n-hexane, heptane, acetone, methyl ethyl ketone, methyl isobutyl ketone, ethyl acetate, butyl acetate, mineral turpentine, perchloroethylene, chlorothene, etc., and may be applied to the fiber material by such methods as spraying, rolling, immersion, etc. Alternatively, said components may be self-emulsified in water as is, or emulsified in water by an appropriate emulsifier such as sulfuric acid ester salt of higher alcohols, salts of alkylbenzene sulfonic acid, higher alcohols-polyoxyalkylene addition products, higher aliphatic acids-polyoxyalkylene addition products, alkyl phenol-polyoxyalkylene addition products and higher aliphatic acid sorbitan ester, and applied to the fiber material by the methods of spraying, rolling, immersion, etc.

In such cases, both components may be dissolved or emulsified separately and then adhered to the fiber material after they have been mixed. Also, the method of applying a solution or emulsion of one of the components to the fiber material and then applying the solution or emulsion of the other component may be adopted. In short, one can adopt any method by which both components are placed together on the fiber material. From the standpoint of uniformity of treatment effects, it is preferable to treat the fiber material with a treatment agent in which both components have been mixed in advance.

It is common to adhere 0.1 to 4 wt % of both components combined with respect to the fiber material. Next, the organic solvent and/or water are removed from the treated fiber material by leaving it alone at normal temperature, by blowing hot air on it, or by applying heat treatment. Then cross linking quickly occurs between the two varieties of organopolysiloxanes when heat treated again, and long-lasting antistatic properties, moisture and perspiration absorptivity, stain resistance (particularly resistance to oily stains), softness, smoothness, crease resistance, and compression recoverability are manifested. Blowing hot air and heat treatment are preferred to leaving it alone at normal temperature in the sense that operating efficiency and durability are further increased.

An appropriate hardening catalyst may be added to the composition of this invention as needed. Also, other conventionally well-known additives such as antistatic agents, softeners, crease resisting agents, heat resisting agents, flame retardants, etc., may be used simultaneously.

The fiber materials which are treated with this treating agent are represented, in terms of material, by natural fibers such as wool, silk, flax, cotton, asbestos, by regenerated fibers such as rayon and acetate, by synthetic fibers such as polyesters, polyamides, vinylon, polyacrylonitriles, polyethylene, polypropylene, and spandex, and by glass fibers, carbon fibers, and silicon carbide fibers. Form-wise, the fiber material may be staple, filament, tow, yarn, woven material, knitted material, non-woven fabric, resin-treated cloth, synthetic leathers, etc., but it is most efficient when treated continuously in sheet forms, such as woven material, knitted material, non-woven material, bedding cotton, etc.

Next, the present invention will be further explained, but not limited, by the following Examples and Comparison Examples. In these, "parts" and "%" indicate parts by weight and wt %, respectively. Viscosity is the value at 25° C. Me denotes the methyl radical.

EXAMPLE 1

A treatment solution was prepared by dissolving 0.4 parts of an organopolysiloxane containing carboxy groups which is expressed by formula (1)

$$\underset{\underset{(CH_2)_3COOH}{|}}{Me(Me_2SiO)_{350}(MeSiO)_8SiMe_3} \qquad (1)$$

and whose viscosity was 3300 centistokes and 0.6 parts of an organopolysiloxane which contains polyoxyalkylene groups and organic groups that contain epoxy groups, and which is expressed by formula (2)

$$Me(Me_2SiO)_{120}(MeESiO)_4(MeGSiO)_{10}SiMe_3 \qquad (2)$$

$$E = -(CH_2)_3-O-CH_2-\underset{\underset{O}{\diagdown\diagup}}{CH-CH_2}$$

$$G = -(CH_2)_3-O-(C_2H_4O)_{20}-(C_3H_6O)_{20}-CH_3$$

and which had a viscosity of 3500 centistokes in 99 parts of toluene.

White fabric (without resin treatment or antistatic treatment) of polyester/cotton (65/35) was dipped in this treatment solution. It was drawn out and squeezed with a mangle roll so that the amount of adhered organopolysiloxane became 1%, and then was air dried. Next, a crosslinking reaction of the two varieties of organopolysiloxane was completed by heat treating this for 10 minutes at 170° C.

As Comparison Examples, a treatment solution composed of the carboxy group-containing organopolysiloxane shown by formula (1) (1 part) and toluene (99 parts), and a treatment solution composed of the organopolysiloxane containing organic groups containing epoxy groups and polyoxyalkylene groups which is shown in formula (2) (1 part) and toluene (99 parts) were prepared and used to treat the white fabric by the same conditions as above. Using these treated cloths, the tests of antistatic properties, of the ratio of organopolysiloxane remaining after cleaning, and of stain resistance, which are shown below were carried out.

First, in order to investigate antistatic properties, each treated cloth and untreated cloth was immersed in perchloroethylene, stirred for 15 minutes, and dried. This process was adopted as a substitute for dry cleaning. This operation was repeated two times. They were further cleaned for 15 minutes in a 0.5% aqueous solution of Marcel soap on the strong cycle of an automatic spin reversal electric washing machine. Then they were rinsed and dried. This process was repeated two times. The untreated and treated cloths which were cleaned and the untreated and treated cloths which were not cleaned were left alone for one week at 20° C. and a humidity of 65%. Then the friction voltage after 60 seconds of rotation at 800 times/min was measured using a Kyoto University Chemical Lab rotary static test and using cotton cloth (unbleached muslin No. 3) for the friction cloth.

Also, the ratio of organopolysiloxane remaining on the cleaned treated cloth was measured using a fluorescent X-ray apparatus (manufactured by Rigaku Denki Kogyo K.K.).

Next, in order to investigate stain resistance with respect to oily strains, ASTM-No. 1 oil (300 g), coal tar (3 g), dried clay powder (5 g), Portland cement (5 g), sodium dodecylbenzene-sulfonate (5 g) were thoroughly ground in a mortar and mixed. The artificial stain mixture prepared in this manner (5 ml) and a 0.5% aqueous solution of Marcel soap (100 ml) were placed in 450 ml glass bottles. Then a 5×10 cm treated cloth and an untreated cloth which had been cleaned (dry cleaned two times and washed with soap two times) were placed in the above-mentioned glass bottles respectively, and ten steel balls were added to each. The test cloths were immersed in the artificial staining solution and treated for 30 minutes at 60° C. After being lightly rinsed and dried, they were washed for 10 minutes on the strong cycle of an automatic spin reversal electric washing machine using a 0.5% aqueous solution of Marcel soap. After the test cloths were washed and dried, their reflectivity at a wavelength of 550 m*m was measured using a reflectometer.

The results of these measurements are shown in Table I. As is clear from these measured values, the cloth treated with the treatment agent of the present invention excels in the durability of both antistatic properties and stain resistance when compared to the Comparison Examples.

TABLE I

| Tests | Present Invention Cloth treated with treating agent of formulas (1) and (2) | Untreated cloth | Comparison Examples Cloth treated with treating agent of formula (1) only | Cloth treated with treating agent of formula (2) only |
|---|---|---|---|---|
| Frictional charge | | | | |
| Before washing (V) | 920 | 1450 | 1830 | 850 |
| After washing (V) | 1110 | 1460 | 1650 | 1310 |
| Ratio of organopolysiloxane remaining (%) | 41 | — | 26 | 11 |
| Reflectivity at 550 m*m(%) | 65 | 52 | 43 | 50 |

EXAMPLE 2

A treating solution was prepared by dissolving the organopolysiloxane containing carboxy groups which is expressed by formula (3)

$$\underset{\underset{(CH_2)_2COOH}{|}}{Me(Me_2SiO)_{400}(MeSiO)_7SiMe_3} \qquad (3)$$

and which had a viscosity of 3500 centistokes (1 part) and the organopolysiloxane containing amino groups and polyoxyalkylene groups, which is expressed by formula (4)

$$Me(Me_2SiO)_{130}(MeSiO)_3(MeSiO)_{10}SiMe_3 \qquad (4)$$
$$\underset{\underset{\underset{\underset{NH_2}{|}}{(CH_2)_2}}{\underset{NH}{|}}}{(CH_2)_3} \quad \underset{O-(C_2H_4O)_{10}H}{(CH_2)_3}$$

and which had a viscosity of 4000 centistokes (0.5 parts) in perchloroethylene (98.5 parts).

Knit underwear (100% cotton) was immersed in this treatment solution, and then the excess solution was removed by a centrifugal dehydrator until the amount of organopolysiloxane adhering was 1.5%. Then the treated underwear was air dried for 24 hours at room temperature. Next, it was heat treated at 120° C. for 5 minutes.

As Comparison Examples, a treatment solution composed of the carboxy group-containing organopolysiloxane shown by formula (3) (1.5 parts) and perchloroethylene (98.5 parts) and a treatment solution composed of the organopolysiloxane containing amino groups and polyoxyalkylene groups which is shown by formula (4) (1.5 parts) and perchloroethylene (98.5 parts) were prepared.

Underwear (100% cotton) was treated by the same conditions as above, using these Comparison Example solutions.

Each treated cloth and untreated cloth was cleaned for 15 minutes in a 0.5% aqueous solution of Marcel soap on the strong cycle of an automatic spin reversal electric washing machine, rinsed, and dried. This operation was repeated 5 times.

Tests of the ratio of organopolysiloxane remaining and of reflectivity at 550 m*m were carried out in the same manner as in Example 1 with respect to treated and untreated cloths which were cleaned and treated and untreated cloths which were not cleaned. Also, the feel of the fabric was investigated by sensory inspection with the hand with respect to each treated cloth and untreated cloth after cleaning.

These results are shown in Table II. They shown that the cloths treated with the treating agent of the present invention are more excellent in stain resistance and in feel of the fabric.

TABLE II

| Tests | Present Invention Cloth treated with treating agent of formula (3) and (4) | Comparison Examples | | |
|---|---|---|---|---|
| | | Untreated cloth | Cloth treated with treating agent of formula (4) only | Cloth treated with treating agent of formula (3) only |
| Ratio of organopolysiloxane remaining (%) | 72 | 0 | 31 | 29 |
| Reflectivity at 550 m* (%) | 73 | 51 | 58 | 43 |
| Feel of fabric after washing | Both softness and flexibility extremely good | Both softness and flexibility extremely poor | Both softness and flexibility fairly good | Softness good, flexibility fairly good |

That which is claimed is:

1. A composition for treating fibers, said composition comprising an organopolysiloxane component (A) having the formula $$A(R_2SiO)_k(RSiO)_mSiR_2A$$
$$|$$
$$R^1COOR^2$$

and one other organopolysiloxane component selected from the group consisting of organopolysiloxane (B) having the formula $$B(R_2SiO)_p(RSiO)_q(RGSiO)_rSiR_2B$$
$$|$$
$$R^3(NHCH_2CH_2)_aNHR^4$$

and an organopolysiloxane (C) having the formula $$D(R_2SiO)_x(RESiO)_y(RGSiO)_zSiR_2D$$

wherein, at each occurrence,
A denotes R or $R^1COOR^2$;
B denotes R or $R^3(NHCH_2CH_2)_aNHR^4$ or G;
D denotes R or E or G;
E denotes

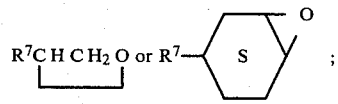

G denotes $R_b{}^5O(C_2H_4O)_c(C_3H_6O)_dR^6$;
R denotes a substituted or unsubstituted monovalent hydrocarbon group;
$R^1$ denotes a divalent hydrocarbon group;
$R^2$ denotes a hydrogen atom or a monovalent hydrocarbon group;
$R^3$ denotes a divalent hydrocarbon group;
$R^4$ denotes a hydrogen atom or a monovalent hydrocarbon group;
$R^5$ denotes a divalent organic group;
$R^6$ denotes a hydrogen atom or a terminating group;
$R^7$ denotes a divalent organic group;
a has a value of from 0 to 10;
b has a value of 0 or 1;
c has a value of from 0 to 50;
d has a value of from 0 to 50;
c+d has a value of from 1 to 100;
k has a value of from 0 to 2000;
m has a value of from 0 to 200;
k+m has a value of from 1 to 2000;
p has a value of from 0 to 1000;
q has a value of from 0 to 100;
r has a value of from 0 to 100;
p+q+r has a value of from 2 to 1000;
x has a value of from 0 to 1000;
y has a value of from 0 to 100;
z has a value of from 0 to 100;
x+y+z has a value of from 2 to 1000;
there being at least two $R^1COOR^2$ groups per molecule of component (A), at least two $R^3(NHCH_2CH_2)_aNHR^4$ groups and at least one G group per molecule of component (B) and at least two E groups and at least one G group per molecule of component (C).

2. A composition according to claim 1 wherein, at each occurrence A, B, D and R each denote the methyl group.

3. A composition according to claim 2 wherein, $R^2$, $R^4$ and $R^6$ each denote the hydrogen atom.

4. A composition according to claim 1 comprising component (B).

5. A composition according to claim 1 comprising component (C).

6. A composition according to claims 1, 2, 3, 4 or 5 further comprising an organic solvent to provide a solution for treating fibers or water to provide an emulsion for treating fibers.

* * * * *

UNITED STATES PATENT AND TRADEMARK OFFICE
CERTIFICATE OF CORRECTION

PATENT NO. : 4,427,815
DATED : Jan. 24, 1984
INVENTOR(S) : Osao Ona, Masaru Ozaki, Yoichiro Taki It is certified that error appears in the above-identified patent and that said Letters Patent is hereby corrected as shown below:

In Column 2, line 18, "invention" should read -- inventors ---.

In Column 2, line 32, "$B(R_2SIO)_p(RSiO)_q$" should read -- $B(R_2SiO)_p(RSiO)_q$ --.

Signed and Sealed this

Sixth Day of November 1984

[SEAL]

Attest:

GERALD J. MOSSINGHOFF

Attesting Officer

Commissioner of Patents and Trademarks